United States Patent [19]
Simich

[11] 3,901,292
[45] Aug. 26, 1975

[54] BALE TIE END FORMER

[75] Inventor: Emil Simich, Chicago, Ill.

[73] Assignee: A. J. Gerrard & Company, Des Plaines, Ill.

[22] Filed: June 19, 1974

[21] Appl. No.: 480,838

[52] U.S. Cl. .................. 140/73; 140/104; 72/217
[51] Int. Cl.² ............................................. B21F 1/06
[58] Field of Search ............. 140/73, 80, 102, 104; 72/217, 218, 219

[56] References Cited
UNITED STATES PATENTS

| | | | |
|---|---|---|---|
| 83,522 | 10/1868 | Miller | 72/217 |
| 189,264 | 4/1877 | Reynolds | 140/104 |
| 343,962 | 6/1886 | Mack | 72/218 |
| 718,409 | 1/1903 | Wilson | 72/217 |
| 3,195,583 | 7/1965 | Jones | 140/73 |

*Primary Examiner*—Lowell A. Larson
*Attorney, Agent, or Firm*—Johnson, Dienner, Emrich & Wagner

[57] ABSTRACT

The apparatus includes a stationary cylindrical forming anvil, a stationary reaction member, a forming roller rotatably mounted on a pivotal lever, and a guide unit secured to the lever. The guide unit presents a support ledge for supporting the end of a bale tie being formed, a stop element for initially locating the end of a bale tie to be formed, and a wedge element for forcing upwardly the body section of a bale tie to permit the free end of the bale tie to pass therebeneath during forming of the end of the bale tie.

9 Claims, 13 Drawing Figures

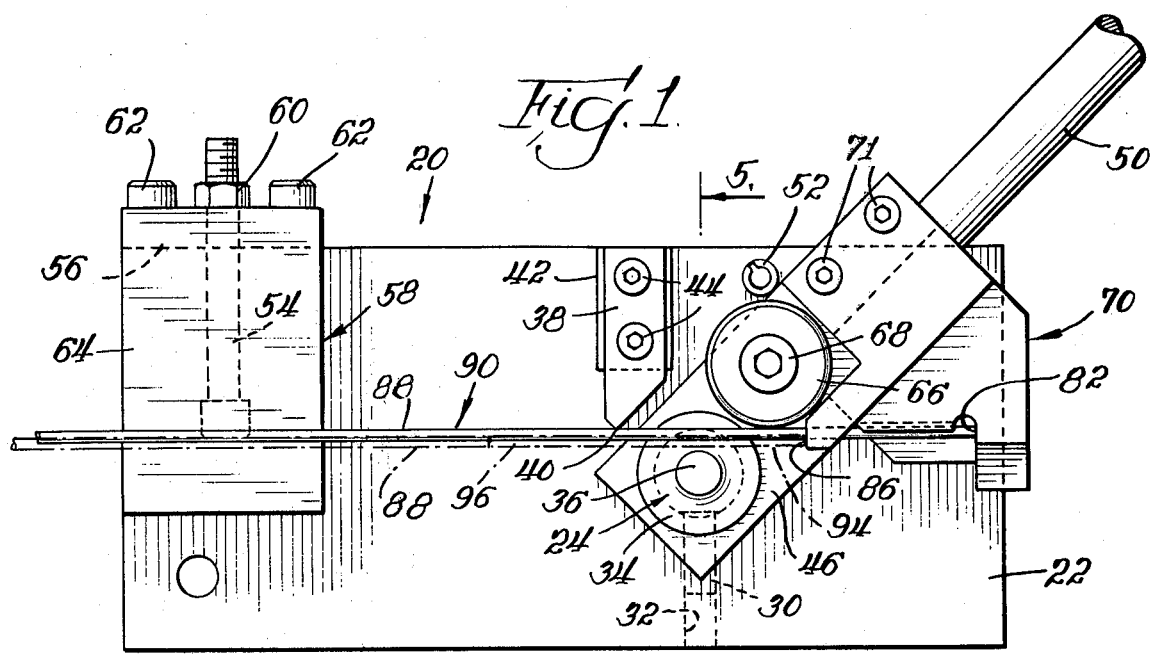
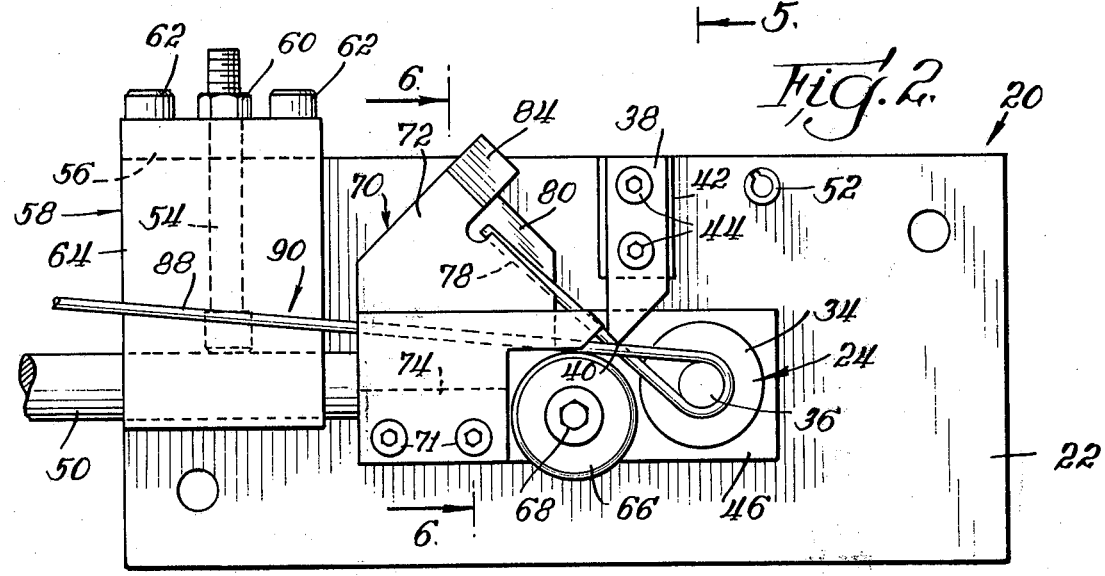
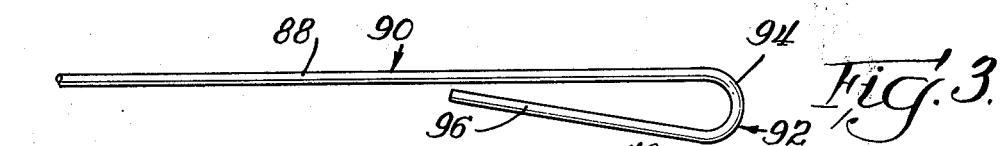
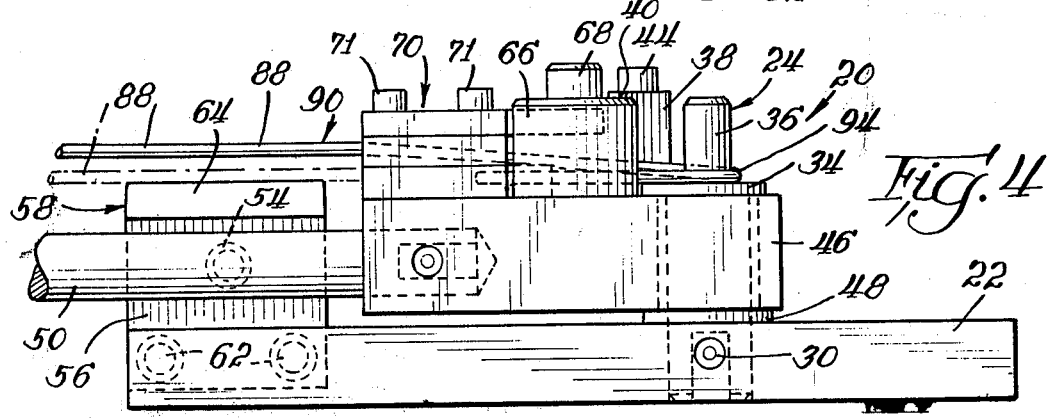

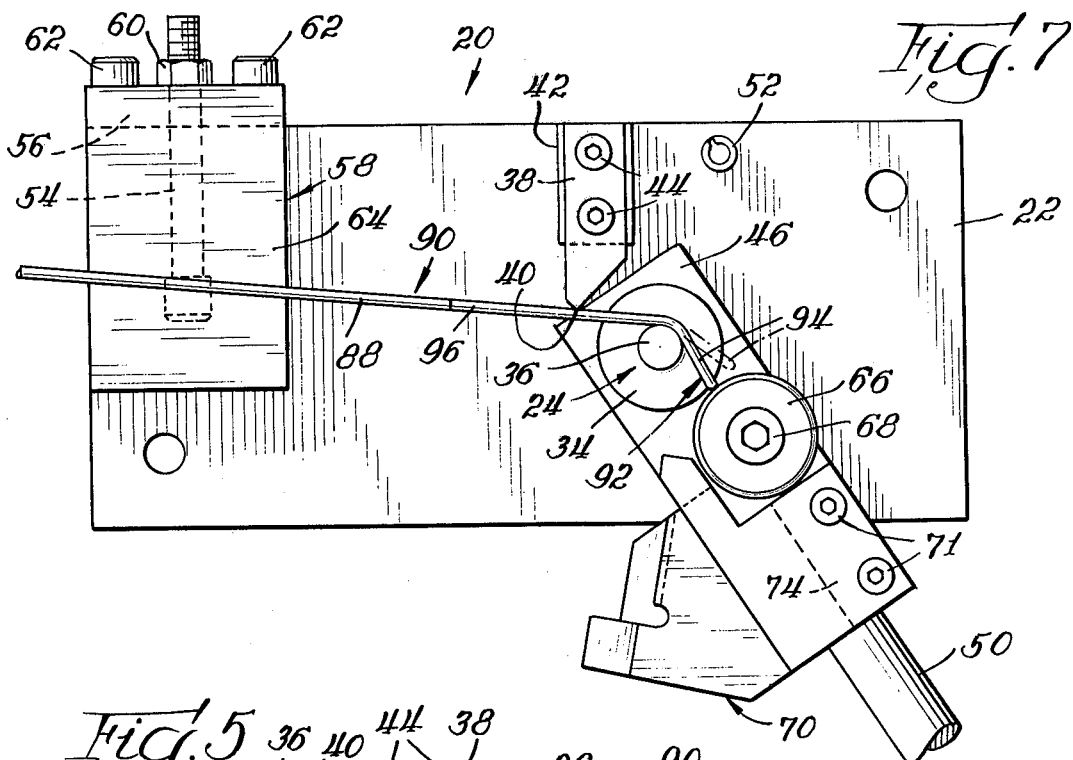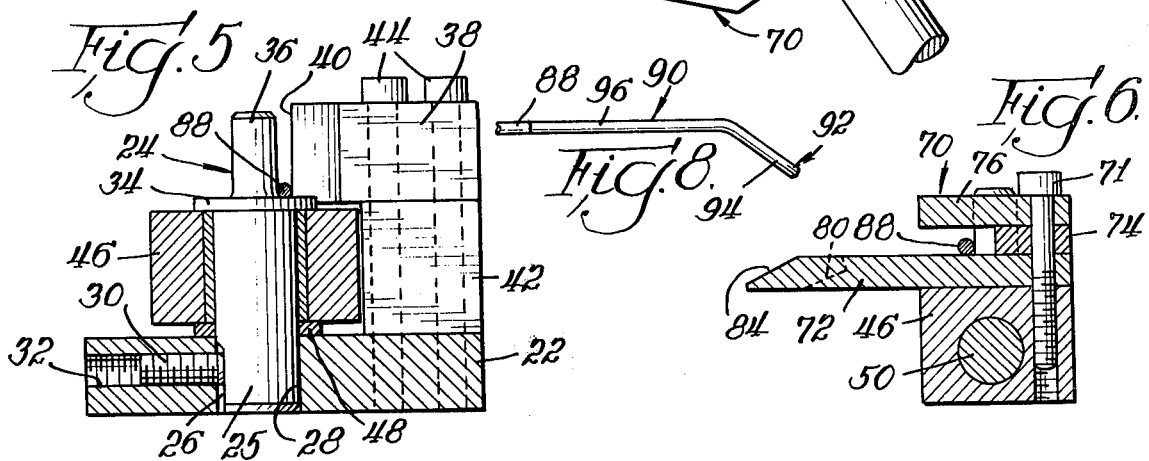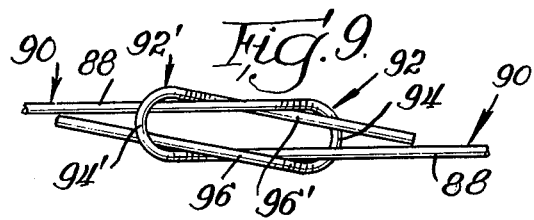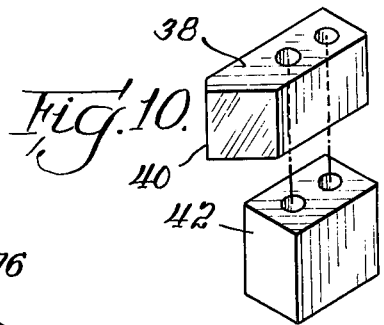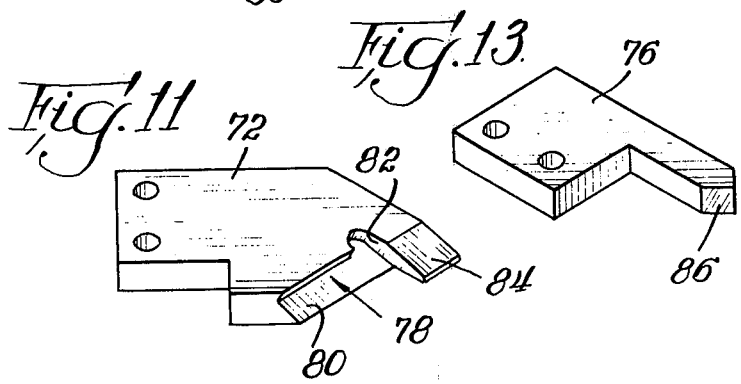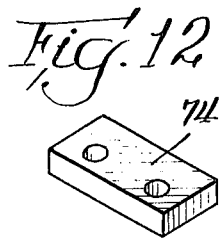

BALE TIE END FORMER

BACKGROUND OF THE INVENTION

Conventionally, a plurality of bale ties with preformed engaging end loops are disposed about an initially compressed bale of cotton or the like and the ends are interlocked to form a knot. Thereafter at a warehouse or the like the bale ties are severed, the bale of cotton is further compressed, new bale ties are engaged about the bale of cotton, and the severed bale ties are discarded.

SUMMARY OF THE INVENTION

The present invention relates to portable apparatus for reforming engaging end sections on a once-used bale tie.

In accordance with the present invention, at a warehouse or the like the conventional bale ties are removed from the bale of cotton, the engaging end loops are severed, the bale of cotton is further compressed, the original bale ties are straightened and cut to the designated length dictated by the further compressed bale of cotton, engaging end sections are reformed with the apparatus of the present invention on the reworked bale ties, and these reformed bale ties are reengaged about the further compressed bale of cotton.

The apparatus of the present invention comprises a base member having a forward end and a rearward end. A stationary cylindrical forming anvil is carried by the base member with its axis on one side of a longitudinal plane normal to the base member. A stationary reaction member is carried by the base member on the other side of the longitudinal plane and is offset at least in part rearwardly of the axis of the forming anvil. A forming roller is rotatably mounted on a pivotal lever carried by the base member. The forming roller has an initial position on the other side of the longitudinal plane and is offset at least in part forwardly of the axis of the forming anvil.

A straight piece of bale tie is inserted in the apparatus, and the lever is pivoted for moving the forming roller from its initial position concentrically of the forming anvil to bend the bale tie about a portion of the latter while the bale tie is engaged by the reaction member, to form a loop portion.

A guide unit is also secured to the lever. The guide unit presents a support ledge for supporting the end of the bale tie being formed, a stop element for initially locating the end of the bale tie to be formed when the forming roller is in its initial position, and a wedge element for forcing upwardly the body section of the bale tie rearwardly of the reaction member to permit the free end of the bale tie to pass therebeneath as the lever is swung to a terminal position during forming of the loop portion at the end of the bale tie.

After the loop portion has been thus formed at the end of the bale tie, the forming roller is returned to its initial position, the bale tie is rotated 90° and the loop portion engaged with a stop element presented by the guide unit. Then, the lever is pivoted for moving the forming roller from its initial position concentrically of the forming anvil to bend the bale tie about a portion of the latter while the bale tie is engaged by the reaction member, to incline the end loop portion.

BRIEF DESCRIPTION OF THE DRAWINGS

FIG. 1 is a plan view of apparatus embodying the principles of the present invention, and shows the components thereof in an initial operating position;

FIG. 2 is a plan view corresponding generally to FIG. 1, but shows the components of the apparatus in a terminal operating position for forming a loop at the end of a bale tie;

FIG. 3 is a top view of a bale tie with a loop formed at the end thereof;

FIG. 4 is a side elevational view of the apparatus of FIG. 2;

FIG. 5 is a sectional view taken substantially along the line 5—5 in FIG. 1 looking in the direction indicated by the arrows;

FIG. 6 is a sectional view taken substantially along the line 6—6 in FIG. 2 looking in the direction indicated by the arrows;

FIG. 7 is a plan view corresponding generally to FIG. 1, but shows the components in an intermediate operating position for inclining the end loop portion of a bale tie;

FIG. 8 is a side view of a bale tie with an inclined end loop portion;

FIG. 9 is a top view of the opposed end sections of a bale tie in an intermediate interlocked position;

FIG. 10 is a perspective view of the reaction member and associated spacer block of the apparatus of FIG. 1; and FIGS. 11–13 are perspective views of the several parts of the guide unit of the apparatus of FIG. 1.

DESCRIPTION OF THE PREFERRED EMBODIMENT

Referring now to FIGS. 1 and 4, there is indicated generally by the reference numeral 20 apparatus embodying the principles of the present invention. The apparatus 20 comprises a horizontal rectangular base member 22 which is adapted to be secured for example to a work table. The base member 22 has a right or forward end and a left or rearward end.

As shown in FIGS. 1 and 5, a stationary vertical cylindrical post member 24 is secured to the base member 22 with its axis lying on one side of a longitudinal plane normal to the base member 22. More specifically, the stem portion 25 of the post member 24, which is provided with a flat 26, is received in a vertical aperture 28 in the base member 22. A set screw 30, threaded in a horizontal aperture 32 in the base member 22, is engaged with the flat 26 for securing the post member 24 in place. The post member 24 is formed with an intermediate annular support collar 34 and an upper cylindrical forming anvil 36.

As shown in FIGS. 1 and 10, a stationary horizontal reaction member 38, which presents a vertical reaction edge 40, is supported on a vertical spacer block 42 in overhanging relation, and is secured to the base member 22 by screws 44. The reaction member 38 is arranged on the other side of the aforesaid longitudinal plane and is offset rearwardly of the axis of the forming anvil 36. More specifically, the reaction edge 40 is disposed on one side of or rearwardly of a transverse plane normal to the base member 22 and passing through the axis of the forming anvil 36.

As shown in FIGS. 1, 2 and 4, pivotal means, in the form of a horizontal lever 46, is pivotally mounted adjacent its one or inner end on the stem portion 25 of the post member 24, and is spaced from the base member 22 by a bronze bushing 48. A lever extension or operating handle 50 is suitably secured in the other or outer end of the lever 46. The lever 46 is swingable in a horizontal plane between an initial position shown in FIG. 1 and a terminal position shown in FIG. 2.

The initial position of the lever 46 is established by a vertical stop pin 52 secured in the base member 22 forwardly of the reaction member 38. The terminal position of the lever 46 is established by an adjustable horizontal stop screw 54 threaded in the vertical leg portion 56 of an inverted L-shaped support member 58 disposed rearwardly of the reaction member 38. The stop screw 54 is provided with a lock nut 60, the lower end of the leg portion 56 is secured to the side of the base member 22 by screws 62, and the horizontal leg portion 64 of the member 58 serves as a support platform.

A forming roller 66 is rotatably mounted on a vertical screw 68 secured in the lever 46 intermediate of the ends thereof. When the forming roller 66 and lever 46 are in the initial position shown in FIG. 1, the forming roller 66 is disposed on the same side of the aforesaid longitudinal plane as the reaction member 38, and is offset forwardly of the axis of the forming anvil 36. During pivotal movement of the lever 46, the forming roller 66 is moved concentrically of the forming anvil 36.

A guide unit 70 is secured by screws 71 to the lever 46 adjacent the forming roller 66. As shown in FIGS. 6 and 11–13, the guide unit 70 comprises a lower plate member 72, an intermediate spacer 74, and an upper plate member 76. The lower plate member 72 (FIG. 11) presents an elongated open side-facing generally V-shaped pocket 78 with a support ledge 80, a stop element in the form of an abutment 82, and a wedge element 84. The upper plate member 76 (FIG. 13) presents a stop element in the form of an abutment 86.

The apparatus 20 is used in the following manner: As shown in solid lines in FIG. 1, the straight elongated body section 88 of a bale tie 90 is inserted in the apparatus and the end thereof is initially located by engagement with the stop element 82. In this position, the bale tie 90 is supported by the platform 66, the collar 34 and the ledge 80, and is retained in position by the side pocket 78. The lever 46 and lever extension 50 are then swung in a horizontal plane from the position shown in FIG. 1 to the position shown in FIG. 2 where the lever extension 50 engages the adjustable stop screw 54.

During pivoting of the lever 46, the forming roller 66 is moved from its initial position to bend the end of the bale tie 90 about the forming anvil 36 while the body section 88 is engaged by the reaction edge 40 of the reaction member 38. As the lever extension 50 approaches the stop screw 54, the wedge element 84 engages and forces the body section 88 upwardly from the dotted line position shown in FIG. 4 to the solid line position to permit the free end of the bale tie 90 to pass therebeneath to the position shown in FIG. 2. When pressure on the lever extension 50 is released, the free end of the bale tie 90 springs back to the position shown in FIG. 3, and an end section 92 is thereby defined comprising a loop portion 94 and a free arm portion 96.

After the loop portion 94 has been thus formed, the lever 46 and forming roller 66 are returned to the position shown in FIG. 1, the partially formed bale tie 90 is rotated 90°, and the loop portion 94 as shown in dotted lines in FIG. 1 is initially located by engagement with the stop element 86. The lever 46 and lever extension 50 are then swung in a horizontal plane from the position shown in FIG. 1 through the position shown in FIG. 7.

During this pivoting of the lever 46, the forming roller 66 is moved from its initial position to bend the loop portion 94 about the forming anvil 36 while the body section 88 is engaged by the reaction edge 40. The forming roller 66 thereby inclines the loop portion 94 away from the axis of the body section 88. The loop portion 94 is initially bent or inclined until the forming roller 66 slips over the end thereof as shown in FIG. 7. As the forming roller 66 clears the loop portion 94, the latter springs back to the dotted line position shown in FIG. 7. The completely formed bale tie 90 is removed and appears as shown in FIG. 8, and the lever 46 and forming roller 66 are again returned to the initial forming position shown in FIG. 1.

After the loop portion 94 has been formed at one end of the bale tie 90 by the apparatus 20, a similar end section (identified by prime reference numerals in FIG. 9) with an oppositely curved and oppositely inclined loop portion 94' is formed at the other end of the bale tie 90 by similar apparatus having reversely arranged parts. In a conventional manner, these end sections 92 and 92' when adjacently positioned are adapted to be interlocked by relative movement to form a knot as shown in FIG. 9. To accommodate bale ties of different diameters, and to form engaging end sections of different configurations, the position of the reaction member 38, stop screw 54 and stop elements 82 and 86 may be changed as required.

While there has been shown and described a preferred embodiment of the present invention, it will be understood by those skilled in the art that various rearrangements and modifications may be made therein without departing from the spirit and scope of the invention.

The invention claimed is:

1. For use in forming the end of a bale tie, apparatus comprising a base member having a forward end and a rearward end, a stationary cylindrical forming anvil carried by said base member with its axis on one side of a longitudinal plane normal to said base member, a stationary reaction member carried by said base member on the other side of said longitudinal plane and offset at least in part rearwardly of the axis of said forming anvil, a lever carried by said base member and pivotally mounted adjacent its inner end on an axis coinciding with the axis of said forming anvil, a forming roller rotatably mounted on said lever spaced from the axis of said forming anvil, said forming roller having an initial position on said other side of said longitudinal plane and offset at least in part forwardly of the axis of said forming anvil, said lever being swingable for moving said forming roller from said initial position concentrically of said forming anvil to bend a bale tie about a portion of the latter while the bale tie is engaged by said reaction member, and a guide unit secured to said lever adjacent said forming roller and presenting a wedge element for forcing upwardly the body section of a bale tie rearwardly of said reaction member to permit the free end of the bale tie to pass therebeneath as said lever is swung to a terminal position during forming of the end of the bale tie.

2. The apparatus of claim 1 wherein said forming anvil is defined at the outer end portion of a post member, said post member includes a stem portion which is secured in said base member and on which said lever is pivotally mounted, and said post member includes an intermediate annular support collar for supporting a portion of a bale tie being formed.

3. The apparatus of claim 1 including a support platform carried by said base member rearwardly of said reaction member for supporting a bale tie being formed.

4. The apparatus of claim 1 including a stop element carried by said lever adjacent said forming roller for initially locating the end of a bale tie to be formed when said forming roller is in said initial position.

5. The apparatus of claim 1 including a guide unit secured to said lever adjacent said forming roller and presenting a support ledge for supporting the end of a bale tie being formed.

6. The apparatus of claim 5 wherein said forming anvil is defined at the outer end portion of a post member, said post member includes a stem portion which is secured in said base member and on which said lever is pivotally mounted, and said post member includes an intermediate annular support collar for supporting a portion of a bale tie being formed.

7. The apparatus of claim 1 wherein said guide unit presents an elongated open side-facing pocket with a support ledge for supporting and retaining in place the end of a bale tie being formed, and presents a stop element for initially locating the end of a bale tie to be formed when said forming roller is in said initial position.

8. The apparatus of claim 7 including a support platform carried by said base member rearwardly of said reaction member for supporting a bale tie being formed; and wherein said forming anvil is defined at the outer end portion of a post member, said post member includes a stem portion which is secured in said base member and on which said lever is pivotally mounted, and said post member includes an intermediate annular support collar for supporting a portion of a bale tie being formed.

9. The apparatus of claim 8 including an adjustable stop member carried by said base member and engageable by said lever for establishing the terminal pivotal position thereof.

* * * * *